No. 782,068.                                                    Patented February 7, 1905.

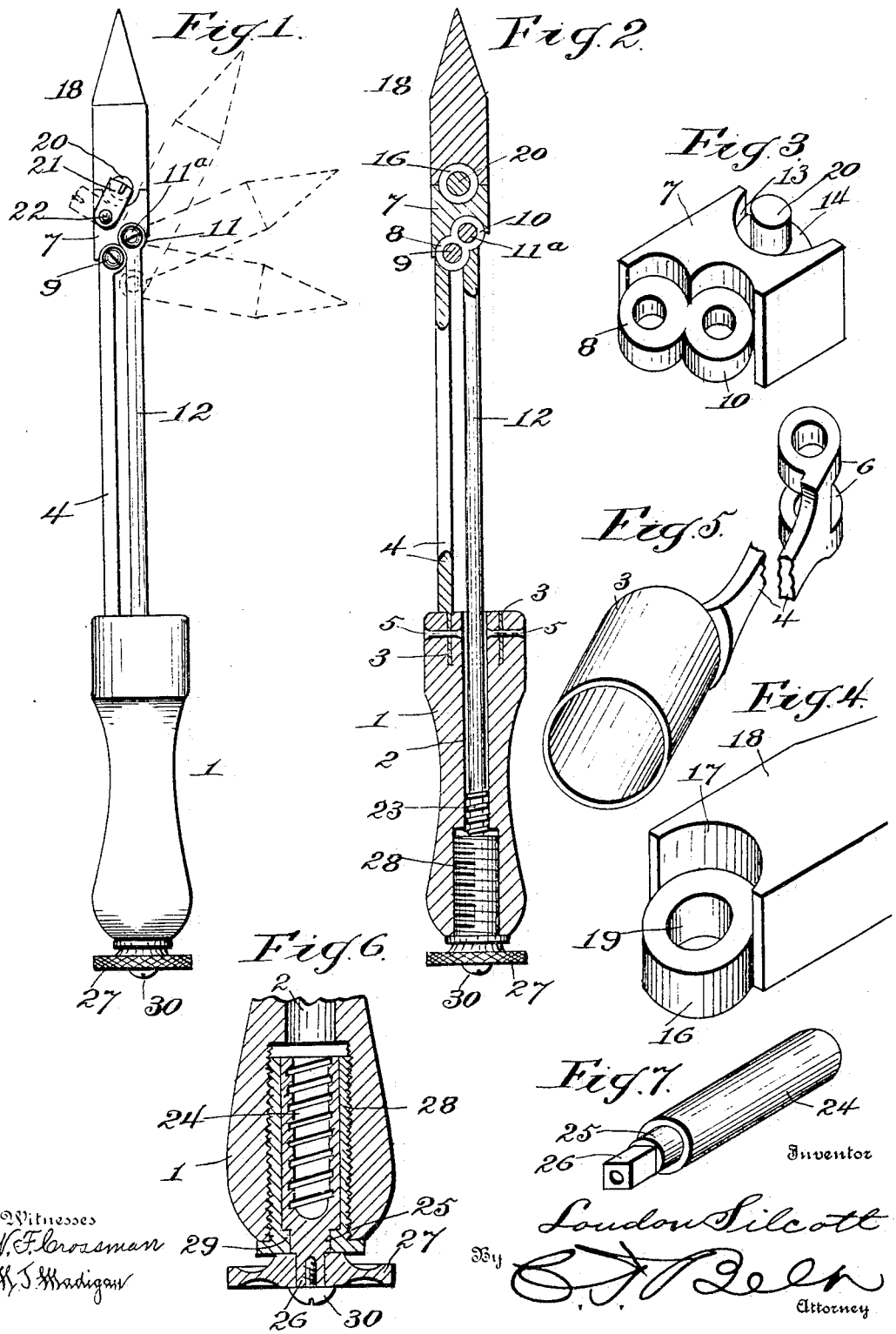

UNITED STATES PATENT OFFICE.

LOUDON SILCOTT, OF MOUNT VERNON, OHIO.

SOLDERING-IRON.

SPECIFICATION forming part of Letters Patent No. 782,068, dated February 7, 1905.

Application filed June 9, 1904. Serial No. 211,778.

*To all whom it may concern:*

Be it known that I, LOUDON SILCOTT, a citizen of the United States, residing at Mount Vernon, in the county of Knox and State of Ohio, have invented certain new and useful Improvements in Soldering-Irons, of which the following is a specification.

This invention relates to soldering-irons, and particularly to the class of such irons having pivoted or adjustable soldering-points controlled by a handle mechanism.

Various devices have been provided for holding soldering-points against movement after they have been adjusted or swung on their pivot by hand to certain positions. These as well as other points are pivoted in the end of a handle stem or tube; but according to my invention the soldering-point is detachably held to a head-block which is doubly pivoted— that is, it is pivoted at one place to an arm fixed to a handle and at another place it is pivoted to a rod working through the handle and operated by a screw action to slide the rod without turning it.

The object, therefore, of the invention is to provide a soldering-iron with a special head-block to detachably hold the soldering-point, to provide means for making a double pivot connection between the soldering-iron handle and the head-block, and to provide a novel and peculiar device for adjusting the head-block and holding it by the same device in such adjusted position.

In the accompanying drawings, forming part of this application, Figure 1 is an elevation showing in dotted lines the soldering-point adjusted to various positions and the keeper (in dotted lines) positioned to permit the removal of the said point. Fig. 2 is a longitudinal section, partly in elevation. Fig. 3 is a perspective view of the head-block. Fig. 4 is a perspective view of the soldering-point. Fig. 5 is a similar view of the arm, partly broken away. Fig. 6 is a detail section of the lower part of the handle. Fig. 7 is a perspective view of the screw-socket.

The same numeral-references denote the same parts throughout the several views of the drawings.

The handle 1 has a central bore 2 and a cavity into which is driven flush with the handle end a sleeve or thimble 3 of the pivot-arm 4, said thimble being fixed by suitable pins 5. The arm 4 has ears 6, one of which is screw-threaded, with an interval or space between them. The head-block 7 has a lug 8 fitting the said ear-space and loosely held therein by a pivot-screw 9. Set in from the lug 8 on the block is a like lug 10, to which is pivoted the ears 11 by a pivot-screw 11" of the adjusting and controlling rod 12, hereinafter to be further described. Opposite the lugs 8 and 10 in the block is a recess 13 and projection 14, which fit like parts 16 and 17, respectively, in the butt of the soldering-point 18 and has an aperture 19, fitting a stud 20 of the head-block. A plate 21 is pivoted at 22 and forms a keeper for the soldering-point.

The rod 12 has a threaded end 23, working in a screw-socket 24, which has a bearing 25 and a nut end 26, provided with a hand nut or wheel 27. A sleeve 28 is screw-threaded into the handle 1, so as to firmly fix it against turning in operating the device, and the sleeve has a collar 29, in which the bearing 25 works, with the nut end 26 projecting out of the sleeve, and the nut 27 is secured in place by a suitable screw 30 to connect the socket and the sleeve. It is therefore obvious that any rotary movement of the nut 27 will impart a slidable movement to the operating-rod which will swing the soldering-point as desired. It will be seen that the point is securely held to the head-block by the keeper and that the connections between the block, arm, and rod are such as to readily permit the parts to be separated.

That the heat of the soldering-point may not be readily imparted to the arm and rod the head-block is preferably made of brass, while said arm and rod is preferably of steel.

Having thus described my invention, what I claim as new, and desire to secure by Letters Patent, is—

1. In a soldering-iron, a head-block having the soldering-point detachably secured thereto and provided with double pivots one at an angle to the other and having independent connections to the handle of the iron.

2. In a soldering-iron having a suitable handle, a head-block carrying the soldering-point and pivoted to a fixed arm of the handle, a rod slidable through the handle and pivoted to the said block, and means to operate the rod.

3. The combination, with the head-block, the fixed arm to which the block is pivoted, and the rod to which the block is pivoted, of the fixed sleeve, and the screw-socket turnable in the sleeve to slide the said rod without turning it.

4. In a soldering-iron having a suitable handle, an arm fixed to the handle, a head-block pivoted to the arm and carrying a soldering-point, and a rod pivoted to the said block and having a screw end, of the sleeve fixed in the handle, the screw-socket loosely fitting the sleeve and having a projection therefrom, and a hand-nut secured to said projection to connect the sleeve and socket and to turn the latter on the end of the said rod to slide it.

5. The combination, with the head-block, and the soldering-point detachably secured to the block, of a keeper pivoted upon the outside of said block and working over the soldering-point to prevent displacement of the latter.

6. In a soldering-iron, a head-block having the soldering-point detachably secured thereto and provided with pivots one at an angle to the other, and the independent connections from the pivots to the handle of the iron, one of said connections working parallel with and lengthwise the other to vary the position of the said point.

7. The combination, with the head-block carrying a soldering-point, the handle having a central bore, an arm fixed to one end of the handle and having said block pivoted thereto, of means to swing and hold said block at various positions, comprising a rod pivoted to the head-block and having a screw end extending into the handle, a sleeve fixed in the other end of the handle, a screw-socket loose within the sleeve and having a bearing working in said collar and a projection through the collar, and a suitable nut secured to the projection to connect the socket and the sleeve.

In witness whereof I hereunto set my hand in the presence of two witnesses.

LOUDON SILCOTT.

Witnesses:
J. A. SCHAEFFER,
WM. WELSH.